(12) United States Patent
Bot et al.

(10) Patent No.: US 7,344,748 B2
(45) Date of Patent: Mar. 18, 2008

(54) CREAM ALTERNATIVES

(75) Inventors: Arjen Bot, Vlaardingen (NL); Jochen Effey, Baltimore, MD (US); Gina Koch, Baltimore, MD (US); Mark Hendrik Schnitker, Vlaardingen (NL)

(73) Assignee: Unilever Bestfoods, North America, division of Conopco, Inc., Englewood Cliffs, NJ (US)

( * ) Notice: Subject to any disclaimer, the term of this patent is extended or adjusted under 35 U.S.C. 154(b) by 533 days.

(21) Appl. No.: 10/743,612

(22) Filed: Dec. 22, 2003

(65) Prior Publication Data

US 2005/0136171 A1 Jun. 23, 2005

(51) Int. Cl.
*A23D 7/00* (2006.01)

(52) U.S. Cl. ...................... 426/602; 426/601
(58) Field of Classification Search ............. None
See application file for complete search history.

(56) References Cited

U.S. PATENT DOCUMENTS

| | | | | |
|---|---|---|---|---|
| 4,273,790 A * | 6/1981 | Bosco et al. | ................. | 426/335 |
| 4,273,795 A * | 6/1981 | Bosco et al. | ................. | 426/602 |
| 4,279,941 A * | 7/1981 | Bosco et al. | ................. | 426/602 |
| 4,292,333 A * | 9/1981 | Bosco et al. | ................. | 426/335 |
| 4,869,919 A * | 9/1989 | Lowery | ................. | 426/604 |
| 7,118,773 B2 * | 10/2006 | Floeter et al. | ................. | 426/603 |
| 2004/0151823 A1 * | 8/2004 | Daniels et al. | ................. | 426/602 |

FOREIGN PATENT DOCUMENTS

| | | |
|---|---|---|
| EP | 294 119 | 4/1992 |
| EP | 540 085 | 3/1995 |
| EP | 540 087 | 5/1995 |
| EP | 691 080 | 11/2001 |
| WO | 99/51105 | 10/1999 |
| WO | 03/002750 | 1/2003 |
| WO | 03/043430 | 5/2003 |

OTHER PUBLICATIONS

PCT International Search Report and Written Opinion on International Application No. PCT/EP2004/012974 dated Mar. 30, 2005.

* cited by examiner

*Primary Examiner*—Carolyn Paden
(74) *Attorney, Agent, or Firm*—Gerard J. McGowan, Jr.

(57) ABSTRACT

Our invention concerns spreadable and/or spoonable water continuous, gelatin free cream alternatives comprising 10 to 50 wt % of a fat blend and up to 5 wt % of a biopolymer other than gelatin as a thickener, in addition to water as continuous phase, which creams display a Stevens value at 5° C. ($S_5$) of more than 100 gram, while the fat blend comprises vegetable fat(s) and 5 to 75 wt % of dairy fat and which fat blend displays a solid fat index (NMR-Pulse on stabilised fat) at 5° C. ($N_5$) and at 15° C. ($N_{15}$) such that the ratio between $N_{15}$ and $N_5$ (i.e. $N_{15}/N_5$) is less than 0.60.

15 Claims, No Drawings

CREAM ALTERNATIVES

FIELD OF THE INVENTION

Our invention concerns creams (being water continuous fat emulsions) with a hardness which makes them suitable for application as spreadable and/or spoonable cream alternatives and in particular as cream cheese alternatives.

BACKGROUND

Cream alternatives are known from a great number of publications such as e.g. the following references: EP 294119, wherein whippable creams are disclosed that contain a fat based on a mix of lauric fats with a ratio between solid fat index at 15 and 25° C. of more than 1.5, EP 540085 and EP 540087 from which soured spoonable cream alternatives are known based on fat mixtures of liquid oil and hardened lauric fats, while also some butterfat can be present, WO 03/043430 from which spreadable cream alternatives are known that display a Stevens hardness of 100 to 500 grams, wheras the fat applied according to the examples is either a liquid oil or a mixture of liquid oil and hardened coconut oil and a palm oil fraction (which is not specified), this total fat has an N10=5–95, an N20=1–50 and an N35=0–10, while it can be steep melting, as can be calculated from its N20 and N25 values (examples 2 and 3). In the text it is said that dairy fat can be present in this mixture in an amount up to 45 wt %, but this is not examplified. Further the compositions illustrated by the examples contain, as listed in table 1 on page 17 0.7 wt % of gelatin. The reason for adding gelatin is not given but this must have been added to control the oral mouthfeel, because we found that compositions without the gelatin display less acceptable oral mouthfeel. However the addition of gelatin to cream alternatives also has a number of draw backs such as the cream is no longer kosher and creams wherein gelatin is present are less accepted nowadays by the consumer. Addition of butterfat to the compositions according to the examples of WO '430 results in compositions that still lack oral mouthfeel as we noticed.

Moreover in the compositions according to WO '430 the biopolymer is present in a biopolymer phase, wherein the volume fraction of the biopolymer phase is from 0.2 to 0.5 as a result of the processing applied. In our novel food products the biopolymer is also present in the form of a biopolymer phase however herein the volume fraction of biopolymer phase is less than 0.1.

Spoonable creams are further disclosed in EP 691080 and in our earlier non-published WO application 03/02750 wherin however not the use of our steep melting fats is disclosed.

SUMMARY OF THE INVENTION

We now studied whether we could find spreadable cream alternatives that combine the use of steep melting fats containing an appreciable amount of butter fat and which still could be free of gelatin while its melt down and oral mouthfeel are not or at least less deteriorated by the absence of gelatin. Moreover we do have a preference for applying creams wherein the biopolymer phase is present as a volume fraction of biopolymer which is different from the volume fraction mentioned herefore in WO '430.

This study resulted in the creams as defined in the claims, which compositions all fulfil the advantages we were after. Therefore our invention concerns in the first instance a spreadable and/or spoonable water continuous, gelatin free cream alternative comprising 10 to 50 wt % of a fat blend and up to 5 wt % of a biopolymer other than gelatin as a thickener, in addition to water as continuous phase, which cream displays a Stevens value at 5° C. ($S_5$) of more than 100 gram, in particular of 100 to 440 gram, while the fat blend comprises vegetable fat(s) and 5 to 75 wt %, preferably 15 to 70 wt % and most preferably 25 to 60 wt % dairy fat, which fat blend displays a solid fat index (NMR-Pulse on stabilised fat) at 5° C. ($N_5$) and at 15° C. ($N_{15}$) such that the ratio between $N_{15}$ and $N_5$ (i.e. $N_{15}/N_5$) is less than 0.60, preferably less than 0.55 and most preferably less than 0.50.

DETAILED DESCRIPTION OF THE INVENTION

Preferred creams display Stevens values of 250 to 430 at 5° C. and of 175 to 225 at 15° C. and of 35 to 75, most preferably 50 to 75 at 30° C. The most preferred creams have a ratio between $S_{15}$ and $S_5$ of 0.50 to 0.70 and a ratio between $S_{30}$ and $S_5$ of 0.10 to 0.25.

The fat mixtures that are applied preferably have an $N_5$ of 45 to 60, an $N_{15}$ of 20 to 38 and an $N_{30}$ of 0.5 to 3.0.

Although our cream alternatives can be any cream alternative based on a water continuous fat emulsion we prefer soured creams and most preferably soured creams having a pH of less than 5.0, in particular a pH of 3 to 4.8. A typical embodiment of our preferred creams are cream cheese type products Although our creams can comprise an emulsifier selected from the common group of emulsifiers used in water continuous emulsions we prefer creams that are free of emulsifiers.

The vegetable fats in the fat blends that we can apply are typically vegetable fats comprising
(i) a liquid oil and/or
(ii) a soft palm oil fraction and
(iii) a fully hardened high lauric fat and/or
(iv) a SOS and/or SSO rich fat (S being C16 and/or C18 saturated fatty acid residue; O being oleic acid)

The liquid oil herein can typically be selected from the group consisting of rape seed oil; sunflower oil; high oleic sunflower oil; soybean oil; cotton seed oil; maize oil; safflower oil and olive oil, although other liquid oils can be applied as well.

The soft palm oil fraction can be a palm oil olein, in particular having an (SOO+O3)—content of more than 25 wt % (S and O as defined before).

The fully hardened lauric fat preferably is a hardened palm kernel oil with melting point of 38 to 39° C. and/or a hardened coconut oil with melting point 31 to 33° C. and most preferably has an Iodine Value of less than 5.0, most preferably less than 2.0.

The SOS and/or SSO rich fat is preferably selected from allanblackia/cocoa butter or fractions thereof or from cocoa butter equivalents (=CBE's, such as PO-mid).

Most preferred fat blends comprise components A and or B and C and/or D such that
A is the liquid oil and is present in amounts of 0 to 80 wt %
B is the soft palm oil fraction and is present in amounts of 0 to 80 wt %
C is the hardened lauric fat and is present in amounts of 0 to 90 wt % and
D is the SOS and/or SSO rich fat and is present in amounts of 0 to 90 wt %, while the amount of (A+B) is more than 10 wt % and the amount of (C+D) is more than 20 wt %.

Our invention also concerns a new use of our typical fat blends and can be defined as the use of a fat blend comprising vegetable fat and 5 to 75 wt % of dairy fat and displaying an $N_5$ and an $N_{15}$ such that the ratio between $N_{15}$ and $N_5$ is less than 0.60 in water continuous cream alternatives to improve the oral mouth feel of the cream alternative in the absence of gelatin.

The parameters mentioned in this application are well known product parameters and can be measured by well known techniques. N-values for stabilised fats are measured as disclosed in WO 03/043430 (on pages 15-16), using a T-regime of: melt at 80° C.; keep it at 60° C. for 5 min; followed by one day at 0° C. and 30 to 35 min at measurement temperature. Stevens values (in grams/cm$^2$) can be measured according to the method disclosed in WO 03/043430 on page 17 using a sample height of 5 cm; a probe of 0.5 inch; a penetration speed of 2.0 mm/sec and a penetration depth of 10 mm while Iodine values can be measured according to the well known method based on iodine absorption.

EXAMPLES

The processing is performed as mentioned in example 1 of WO 03/043430, however with the exception of the addition of the thickeners (biopolymers/gelatin etc as indicated in the table below) which are added after the acidification of the compositions.

The ingredients used in the different compositions (both according to the invention and of the comparative examples) are given in table 1 wherein also the product performance is given (in terms of Stevens hardness representative for oral mouthfeel).

C. ($N_5$) and at 15° C. ($N_{15}$) such that the ratio between $N_{15}$ and $N_5$ (i.e. $N_{15}/N_5$) is less than 0.60, wherein the vegetable fat in the fat blend comprises A) a liquid oil present in amounts of 0 to 80 wt %

B) a soft palm oil fraction present in amounts of 0 to 80 wt %

C) a fully hardened lauric fat present in amounts of 0 to 90 wt % and

D) a SOS and/or SSO rich fat present in amounts of 0 to 90 wt % (wherein S being C16 and/or C18 saturated fatty acid residue; O being oleic acid) the amount of (A+B) is more than 10 wt % and the amount of (C+D) is more than 20 wt %, said cream alternative being gelatin-free.

2. Water continuous cream alternative according to claim 1, wherein the cream alternative is a soured cream having a pH of less than 5.0.

3. Water continuous cream alternative according to claim 1 wherein the cream alternative is a cream cheese type product.

4. Water continuous cream alternative according to claim 1 wherein the cream is free of emulsifiers.

5. Water continuous cream alternative according to claim 1 wherein the liquid oil is selected from the group consisting of rape seed oil; sunflower oil; high oleic sunflower oil; soybean oil; cotton seed oil; maize oil; safflower oil and olive oil.

TABLE 1

| Example | Type of fat | % fat | N-line fat 5° C. | 15° C. | 30° C. | $N_{15}/N_5$ | Thickener and %. | Stevens value $S_5$ | $S_{15}$ | $S_{30}$ | S15/S5 of cream | S30/S5 of cream |
|---|---|---|---|---|---|---|---|---|---|---|---|---|
| 1 | butter fat | 22 | 64 | 41 | 6.8 | 0.64 | 0.86% Gelatin / 0.21% guar gum | 395 | 238 | 22.5 | 0.60 | 0.06 |
| 2 | butter fat | 22 | 64 | 41 | 6.8 | 0.64 | 0.143% Carrageenan / 0.475% LBG | 227 | 157 | 49.5 | 0.69 | 0.22 |
| 3 | 50% butter fat 50% veg fat * | 22 | 58 | 29 | 2.4 | 0.50 | 0.143% Carrageenan / 0.475% LBG | 359 | 207 | 66 | 0.58 | 0.18 |
| 4 | Same as in Ex 3 | 22 | 58 | 29 | 2.4 | 0.50 | 0.86% Gelatin / 0.21% guar gum | 450 | 265 | 42 | 0.59 | 0.09 |

* vegetable fat is 40% coconut oil hardened to 31° C./40% palm olein fraction/20% rape seed oil

The invention claimed is:

1. Spreadable and/or spoonable water continuous, gelatin free cream alternative comprising 10 to 50 wt % of a fat blend and up to 5 wt % of a biopolymer other than gelatin as a thickener, in addition to water as continuous phase, which cream alternative displays a Stevens value at 5° C. ($S_5$) of more than 100 gram while the fat blend comprises vegetable fat(s) and 5 to 75 wt % dairy fat, which fat blend displays a solid fat index (NMR-Pulse on stabilised fat) at 5°

6. Water continuous cream alternative according to claim 1 wherein the soft palm oil fraction is palm oil olein having an (SOO+O3)—content of more than 25 wt % (S and O as defined in claim 1).

7. Water continuous cream alternative according to claim 1 wherein the fully hardened lauric fat is a hardened palm kernel oil with melting point of 38 to 39° C. and/or a hardened coconut oil with melting point 31 to 33° C.

8. Water continuous cream alternative according to claim 7 wherein the lauric fat has an Iodine value of less than 5.0.

9. The cream alternative according to claim 8 wherein the lauric fat has an iodine value of less than 2.0.

10. Water continuous cream alternative according to claim 1 wherein the SOS and/or SSO rich fat is selected from allanblackia/cocoa butter or fractions thereof or from cocoa butter equivalents.

11. The cream alternative according to claim 10 comprising a cocoa butter equivalent which is a PO-mid.

12. Water continuous cream alternative according to claim 1 wherein the biopolymer present is present in the form of a biopolymer phase wherein the volume fraction of the biopolymer phase is less than 0.1.

13. The cream alternative according to claim 1 having an $S_5$ of 100 to 400 grams.

14. The cream alternative according to claim 1 having 15 to 70 wt. % dairy fat.

15. The cream alternative according to claim 1 wherein N15:N5 is less than 0.55.

* * * * *